(12) United States Patent
Shotey et al.

(10) Patent No.: US 7,692,107 B1
(45) Date of Patent: Apr. 6, 2010

(54) LUGGAGE WITH WEIGHT SCALE BUILT IN TO LUGGAGE FRAME

(75) Inventors: Marcus J. Shotey, Scottsdale, AZ (US); Jeffrey P. Baldwin, Phoenix, AZ (US)

(73) Assignee: TayMac Corporation, Gilbert, AZ (US)

( * ) Notice: Subject to any disclaimer, the term of this patent is extended or adjusted under 35 U.S.C. 154(b) by 0 days.

(21) Appl. No.: 12/139,939

(22) Filed: Jun. 16, 2008

Related U.S. Application Data (60) Provisional application No. 60/944,018, filed on Jun. 14, 2007.

(51) Int. Cl.
*G01G 19/52* (2006.01)
*G01G 19/58* (2006.01)

(52) U.S. Cl. .................. 177/131; 177/238; 177/245; 190/100; 206/278

(58) Field of Classification Search .............. 177/131, 177/238, 245; 190/100; 206/278
See application file for complete search history.

(56) References Cited

U.S. PATENT DOCUMENTS

| | | | | | |
|---|---|---|---|---|---|
| 2,069,499 | A | * | 2/1937 | Marin et al. ............... | 177/238 |
| 2,518,973 | A | * | 8/1950 | Atherton .................... | 190/102 |
| 2,710,083 | A | * | 6/1955 | White ........................ | 190/102 |
| 2,759,577 | A | * | 8/1956 | White ........................ | 190/102 |
| 3,090,454 | A | * | 5/1963 | Farrar et al. ............... | 177/131 |
| 5,461,947 | A | * | 10/1995 | Batten ........................ | 81/56 |
| 7,151,231 | B2 | * | 12/2006 | Kamakau .................. | 177/126 |
| 7,265,302 | B2 | * | 9/2007 | Keech et al. .............. | 177/131 |
| 7,439,456 | B2 | * | 10/2008 | Ogunnaike ................ | 177/148 |
| 2005/0217903 | A1 | * | 10/2005 | Roberts et al. ............ | 177/245 |
| 2005/0217904 | A1 | * | 10/2005 | Hughes ...................... | 177/245 |
| 2006/0196708 | A1 | * | 9/2006 | Keech et al. .............. | 177/245 |
| 2007/0205025 | A1 | | 9/2007 | Taha | |

* cited by examiner

*Primary Examiner*—Randy W Gibson
(74) *Attorney, Agent, or Firm*—Booth Udall, PLC (57) ABSTRACT

A luggage case having a built in luggage scale is described. A first frame coupled to and substantially coextensive with a bottom wall of a luggage case is provided. The luggage case comprises a lid movable between open and closed positions, the lid being substantially parallel to the bottom wall. A second frame moveably coupled to and substantially parallel to the first frame is provided. At least one load sensor between the first frame and the second frame, the at least one load sensor configured to measure a weight of the luggage case is also provided.

14 Claims, 6 Drawing Sheets

LUGGAGE WITH WEIGHT SCALE BUILT IN TO LUGGAGE FRAME

CROSS REFERENCE TO RELATED APPLICATIONS

This document claims the benefit of the filing date of U.S. Provisional Patent Application 60/944,018 to Shotey, et al. entitled "Portable Built-In Luggage Scale," which was filed on Jun. 14, 2007, the disclosure of which is hereby incorporated herein by reference.

BACKGROUND

1. Technical Field

Aspects of this document relate generally to luggage having built-in scales.

2. Background Art

The ability to easily and accurately measure the weight of luggage has taken on increased importance for travelers as many common carriers have begun to charge, or surcharge, passengers based on the weight of their luggage. In addition, as security measures are instituted or changed, travelers frequently find themselves having time constraints with respect to their travel-related activities, such as packing their luggage. Various devices exist that allow a user to measure the weight of their luggage. One product, marketed by Balanzza, which is basically a fish-scale, allows a user to attach the suitcase by its handle to a strap which is attached to a load-cell with another handle built in. When the user picks up the suitcase via the scale, the digital readout will indicate the total weight. The disadvantage of this product is that the user has to repeat the cycle of adding or subtracting items from the bag, closing the zipper and hanging the scale over and over again until a desired weight is achieved. Another company, called Travelon, also sells an analog version of the same concept.

A company called Ricardo sells an entire line of luggage with the fish-scale idea built in to the suitcase handle. While it may be convenient because the user does not have to worry about forgetting the scale at home or lose it while traveling a user desiring to obtain a weight measurement, must nevertheless add or subtract items from the luggage, close the zipper and the hold the bag up by the handle in order to obtain a weight measurement.

SUMMARY

In one aspect, a first frame is coupled to and may be substantially coextensive with a bottom wall of a luggage case, the luggage case comprising a lid movable between open and closed positions, the lid being substantially parallel to the bottom wall. A second frame is moveably coupled to and substantially parallel to the first frame. At least one load sensor is positioned between the first frame and the second frame, the at least one load sensor configured to measure a weight of the luggage case.

Particular implementations of portable built-in luggage scales may include one or more of the following. The frame may comprise a handle, one or more feet, and one or more wheels, which wheels may be coupled with the first frame and may extend from the first frame substantially parallel to the bottom wall of the luggage case. The second frame may be substantially coextensive with the first frame. The at least one load sensor may comprise at least three load sensors, and in some particular implementations, at least four load sensors. A analog or digital display may be coupled to the at least one load sensor and the load sensor may comprise one or more spring-loaded analog components and/or an electronic load cell. The digital display may further comprise a digital readout circuit board.

In another aspect, a luggage case having a scale device comprises a first frame comprising a depth defined between at least one first frame contact surfaces and a perimeter edge, the perimeter edge comprising a suspensory trap. A second frame coupled with the luggage case and comprising at least one second frame contact surfaces and a perimeter lip, the perimeter lip slidably coupled with the suspensory trap so that the minor frame moves vertically with respect to the first frame without the perimeter lip decoupling from the suspensory trap is provided. At least one load sensor disposed between the first frame and the second frame and in mechanical communication with the at least one first frame contact surfaces and the one or more second frame contact surfaces is provided.

Particular implementations of portable built-in luggage scales may include one or more of the following. The first frame may comprise a handle, one or more feet, and one or more wheels, which wheels may be coupled with the first frame and may extend from the first frame substantially parallel to the bottom wall of the luggage case. The second frame may be substantially coextensive with the first frame. The at least one load sensor may comprise a digital or an analog display and one or more electronic load cells or spring-loaded analog components. The at least one digital load sensor may further comprise a digital readout circuit board. The at least one load sensor may comprise at least three load sensors, and in particular implementations at least four load sensors.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Luggage comprising a portable built-in luggage scale will hereinafter be described in conjunction with the appended drawings, where like designations denote like elements, and.

DESCRIPTION

This document features a luggage case with a portable built-in luggage scale. There are many features of a luggage case having a built-in scale disclosed herein, of which one, a plurality, or all features may be used in any particular implementation.

Figure 1:
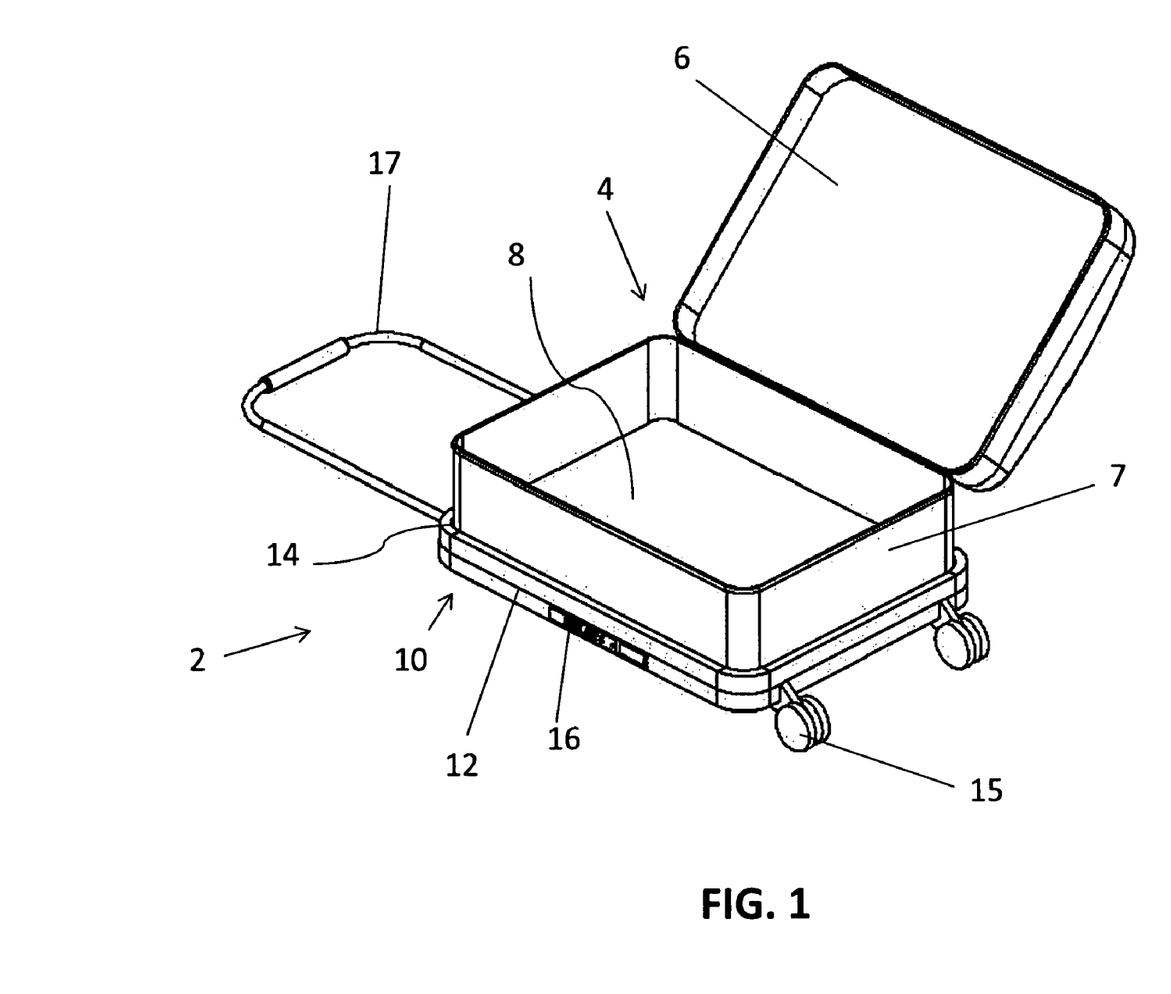
FIG. 1 is a top isometric view of one particular implementation of a luggage case having a built in luggage scale.
Figure 2:
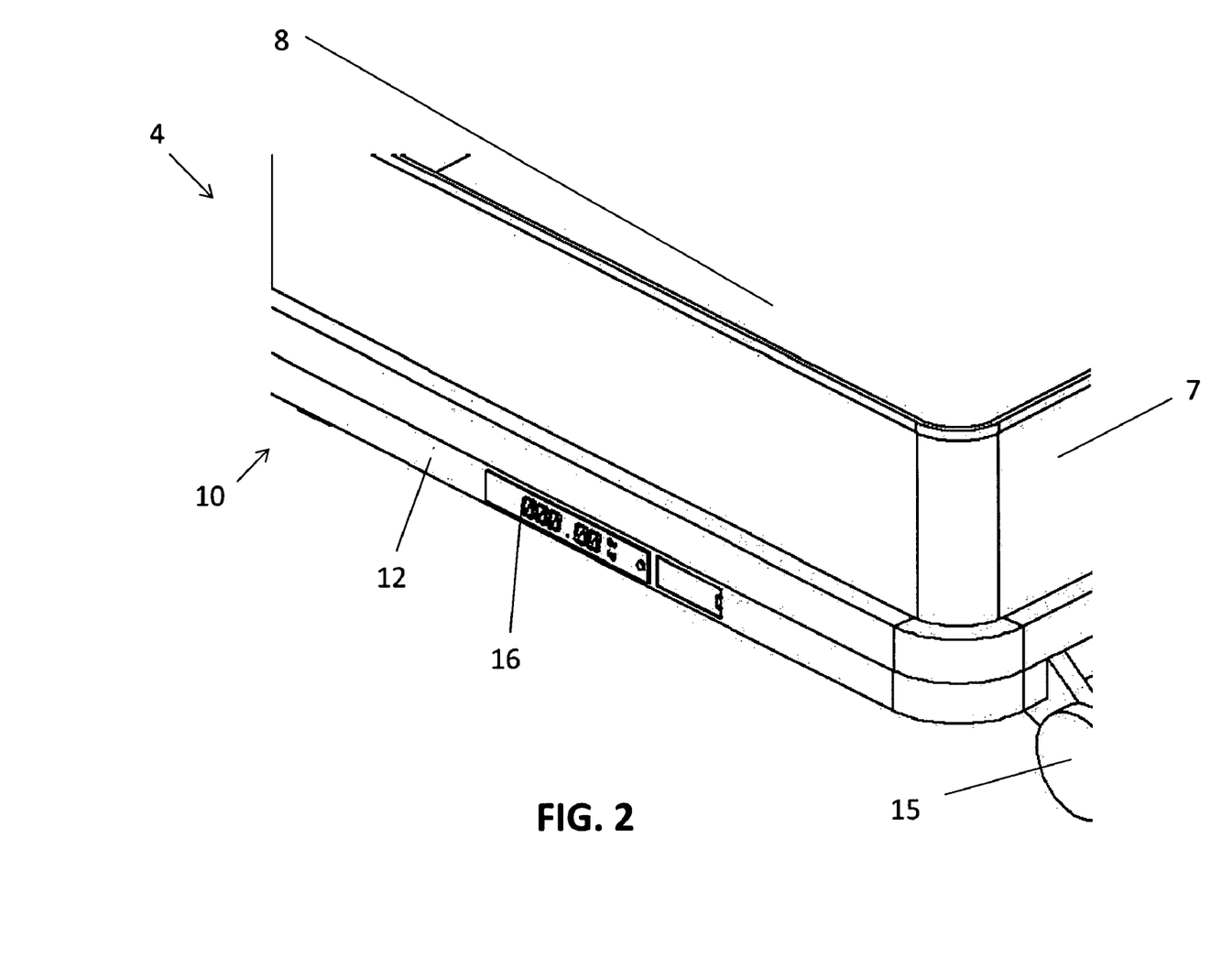
FIG. 2 is a close up view of a frame assembly and luggage case.
Figure 3:
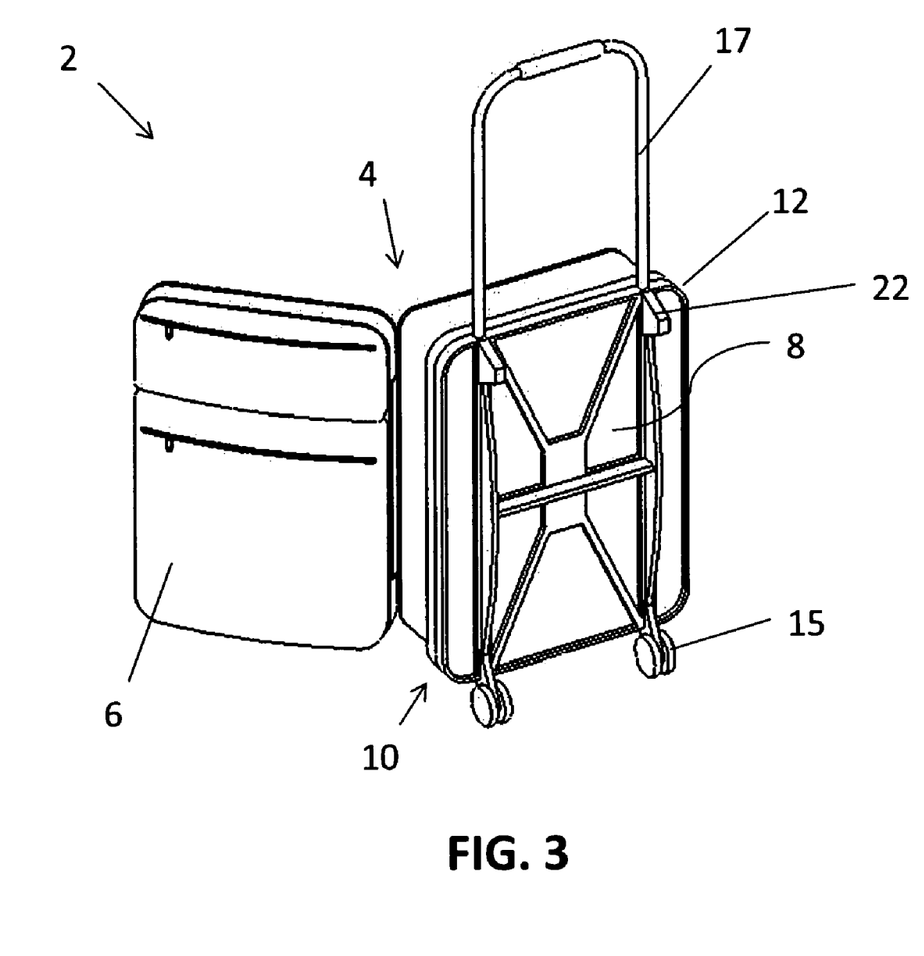
FIG. 3 is a bottom view of one particular implementation of a luggage case having a built in luggage scale.

There are a variety of possible luggage scale implementations. Notwithstanding, with reference to FIG. 1, a top view of one particular implementation of a luggage case having a built in luggage scale is illustrated. Many advantages are made possible, either in combination or separately, from particular implementations of a luggage case having a built-in scale disclosed in the present application. Those advantages relate, among other things, to the real-time weighing of the contents of a luggage case as the luggage case is being packed and providing a user with efficient and convenient packing options. Travelers are increasingly facing additional charges from common carriers in the event that their luggage exceeds a specified weight limit. In addition, travelers are facing increasing time pressures as security measures are instituted or changed. As such, the ability to quickly and conveniently monitor the weight of luggage as it is being packed is extremely beneficial.

FIGS. 1-4 illustrate various views of one particular implementation of a luggage case having a built in luggage scale. Luggage case having a built-in luggage scale 2 comprises frame assembly 10, which comprises first frame 24 and second frame 12. Luggage case 4 comprises lid 6, one or more side walls 7, and bottom wall 8. It will be understood that lid 6 is movable between open and closed positions and that lid 6 is substantially parallel to bottom wall 8 when lid 6 is in a closed position. It will be further understood that luggage case 4 may comprise luggage cases of all sizes. Examples of luggage cases may include, by way of non-limiting example, and including either hard side or soft sided versions of luggage cases, suitcases, valises, trunks, overnight cases, travel cases, or any other cases or bags used to store and transport personal effects.

Still referring to FIGS. 1-4, in particular implementations, first frame 24 is substantially coextensive with, and coupled to, a bottom wall 8 comprising luggage case 4. First frame 24 further comprises perimeter lip 25 (as shown and described with respect to FIGS. 4 and 5). In any event, second frame 12 is movably coupled and substantially parallel to first frame 24 (obscured in this view). In particular implementations, second frame 12 is substantially coextensive with first frame 24. In other particular implementations, second frame 12 comprises display 16. It will be understood that display 16 is configured to indicate a weight measurement of a luggage case having a built-in luggage scale 2. In particular implementations, display 16 may comprise an analog display. In other particular implementations, display 16 may comprise a digital display. Whether display 16 is configured to comprise an analog or a digital display, it will be understood that display 16 may be configured to indicate a weight measurement in either English or metric units of measure, for which a selector switch may be provided on second frame 12 (in the case of a digital display). In addition to the above, second frame 12 may comprise one or more handles 17 (which may be retractable), one or more feet 22 (FIG. 3), and one or more wheels 15. In particular implementations, the one or more wheels 15 may be coupled with second frame 12 so as to extend from second frame 12 substantially parallel to bottom wall 8 of luggage case 4. With second frame 12 oriented parallel to and facing a horizontal surface, the one or more feet 22 and the one or more wheels 15 may be placed in contact with the horizontal surface and may support second frame 12 with respect to the horizontal surface.

Figure 4:
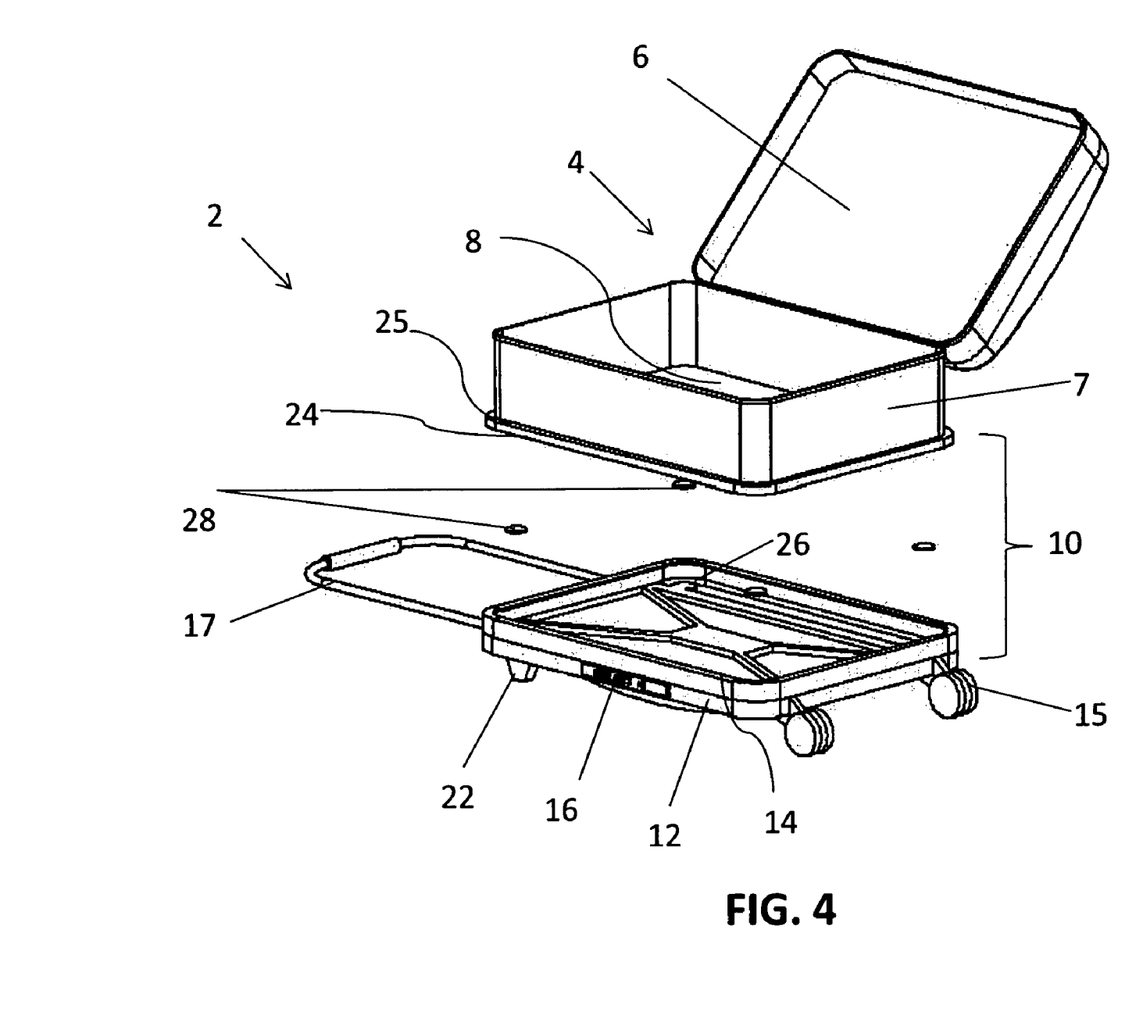
FIG. 4 is an exploded view of one particular implementation of a luggage case having a built in luggage scale.
Figure 5:
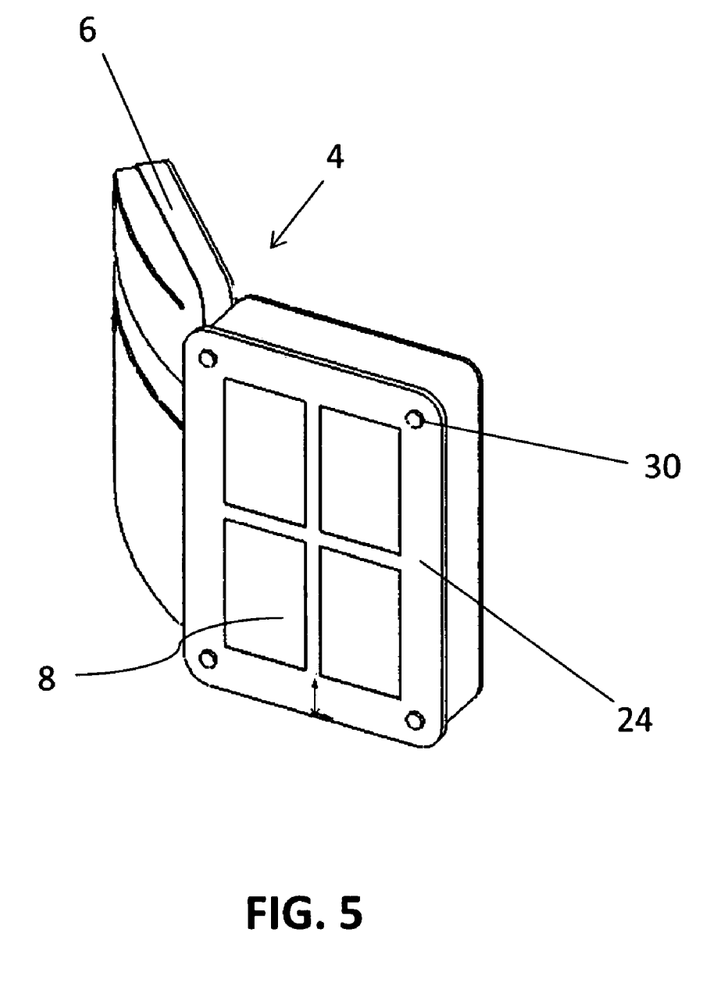
FIG. 5 is a bottom view of a luggage case coupled with a second frame.

With specific reference to FIGS. 4-5, an exploded view and a bottom view, respectively, of a luggage case having a built-in luggage scale are illustrated. Referring specifically to FIG. 5, first frame 24 is substantially coextensive with bottom wall 8 of luggage case 4, that is, a substantial portion of first frame 24 is in contact with a substantial portion of bottom wall 8. At least one load sensor 28 is disposed between, and in mechanical communication with, second frame 12 and first frame 24. In particular implementations, second frame 12 comprises at least one second frame contact surface 26, the at least one second frame contact surface 26 aligned with at least one first frame contact surface 30 of first frame 24. In particular implementations, the at least one load sensor 28 may be disposed between, and in mechanical communication with, at least one second frame contact surface 26 of second frame 12, and at least one first frame contact surface 30 of first frame 24. In other particular implementations, the at least one load sensor 28 comprises at least three load cells. In still other particular implementations, including the particular implementations shown in the Figures, the at least one load sensor comprises four or more sensors. Different sizes, shapes and dimensions of luggage cases may require or simply be easier to gauge the luggage case weight using more sensors with different patterns of placement between the first and second frames.

In any event, load sensor 28 may comprise any device capable of measuring and outputting an indication of weight. In some particular implementations, load sensor 28 may comprise a spring-loaded device. In other particular implementations, load sensor 28 may comprise a digital load cell such as, by way of non-limiting example, the Omega® LCGD-250 load cell. In still other particular implementations, load sensor 28 may comprise a transducer which converts force into a measurable electrical output. In yet other particular implementations, the digital load cell may comprise a strain gauge based load cell. It will be understood that in the case where load sensor 28 comprises a digital load cell (or other digital sensor), weight measurement circuitry, digital readout circuit board, a digital display, and other components known in the art may be used to implement a digital load sensor and accurately display a single weight measurement based on the outputs of at least one load sensor 28. In any event, and regardless of the type of load sensor 28 used, it will be understood that the at least one load sensor 28 may be compressed or "loaded" between the at least one first frame contact surface 26 and the least one second frame contact surface 30. It will be further understood that a luggage case comprises a weight and that the load on the at least one load sensor 28 may correspond to a weight of a luggage case. Of course, the at least one load sensor 28 may be "tared" so as to provide a "net" weight of only the contents of a luggage case 4 or, in particular implementations, the at least one "load sensor 28 may be configured to provide a "gross" weight of the contents of luggage case 4, including the weight of luggage case having a built-in luggage scale 2. In either case, however, the load sensor is measuring a weight of the luggage case.

Figure 6:
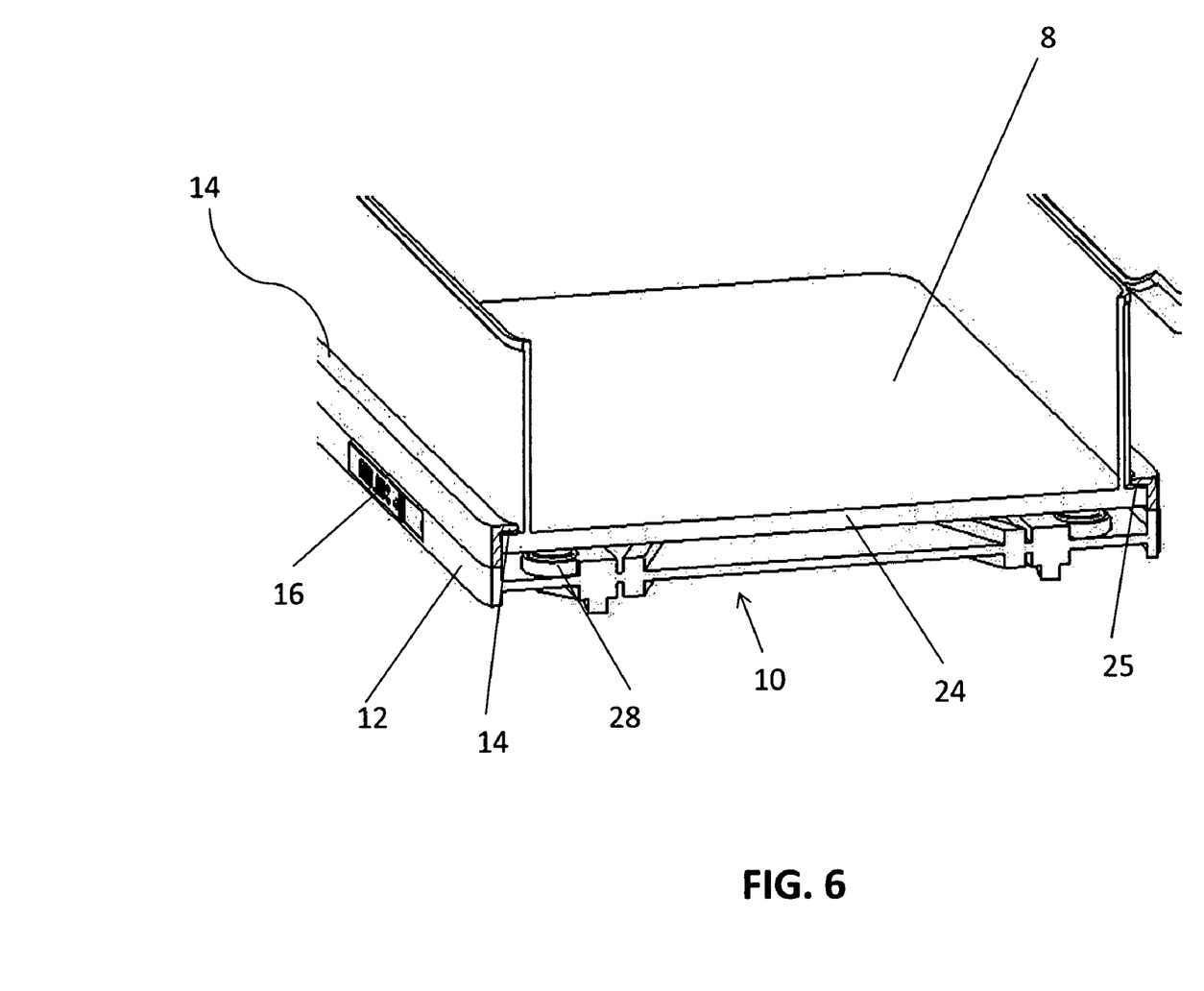
FIG. 6 is a section view of a frame assembly.

FIG. 6 illustrates a close up section view of a frame assembly. In particular implementations, second frame 12 comprises suspensory trap 14 (comprising an interior and an exterior perimeter measurement) disposed along a perimeter edge comprising second frame 12. In particular implementations, first frame 24 may comprise a perimeter lip 25, which may comprise an outer perimeter measurement. It will be understood that in particular implementations the outer perimeter measurement of perimeter lip 25 may be slightly less than the interior perimeter measurement of suspensory trap 14 so that first frame 24 is vertically, slidably coupled with respect to second frame 12. Specifically, as weight is added to, or subtracted from, bottom wall 8, first frame 24 may move closer to, or away from, respectively, second frame 12. It will be understood that as weight is added to the luggage case 4, adding weight relative to the bottom wall 8 (which is coupled to first frame 24), the at least one load sensor 28 may undergo increased compression or "loading" as the at least one load sensor is compressed between first frame 24 and second frame 12. Conversely, as weight is removed from the luggage case 4, removing weight relative to the bottom wall 8, the at least one load sensor 28 may undergo "decompression" and decreased loading. It will be further understood that the presence of suspensory trap 14 may resist the decoupling of first frame 24 from second frame 12 since, in this particular implementation, perimeter lip 25 may be impinged by suspensory trap 14 in the event of excess movement of first frame 24 away from second frame 12. In particular implementations, the amount of vertical travel of first frame 24 with respect to second frame 12 may be restricted by, among other things, reducing the vertical depth of second frame 12.

Although suspensory trap 14 is associated with second frame 12 in the referenced Figures, suspensory trap 14 may be formed integrally with second frame 12 or separately and coupled to second frame 12. For example, assembly may be made easier if sensory trap 14 was formed separately as a ring that was snappably coupled to and thereby became part of second frame 12. Assembly could be accomplished by placing first frame 24 and bottom wall 8 of luggage case 4 on top of second frame 12 and its sensors 28, and snapping suspensory trap 14 ring around second frame 12 with suspensory trap 14 retaining perimeter lip 25 of first frame 24.

Furthermore, although suspensory trap is associated with second frame 12 in the referenced Figures, the configuration of the first and second frames may be reversed so that suspensory trap 14 is associated with first frame 24 and couples around or to second frame 12 to hold second frame 12 to first frame 24. Additionally, although the suspensory trap in the referenced Figures is shown around the perimeter of first frame 24, it will be understood that the function of the suspensory trap is to maintain the moveable, yet vertically limited relationship between the first and second frames so that the sensors can more accurately measure the luggage weight of first frame 24 on second frame 12 with sensors 28 in between. Accordingly, in a particular implementation the suspensory trap may be configured in many different equivalent configurations to meet this end including, but not limited to, an intermittent suspensory trap that allows first frame 24 to snap into the suspensory trap. In another particular implementation, a suspensory trap is not positioned around the periphery, but extends through or is coupled to the bottom of the bottom wall 8 so that first frame 24 can still move, but has limits to its movement to keep it above second frame 12. In still another particular implementation, the second frame is not substantially coextensive with first frame 24, but is smaller than first frame 24 and is positioned at or near the center of first frame 24. In this implementation, the second frame still couples to the first frame, but is smaller than the first frame.

It will be understood that a luggage case having a built in luggage scale implementations are not limited to the specific parts, devices and components disclosed in this document, as virtually any parts, devices and components consistent with the intended operation of a luggage case having a built in luggage scale implementation may be utilized. Accordingly, for example, although particular first frames, second frames, luggage cases, lids, bottom walls, load sensors, contact areas, handles, wheels, feet, digital circuit boards, displays, perimeter lips, and suspensory traps, and other parts, devices and components are disclosed, such may comprise any shape, size, style, type, model, version, class, measurement, concentration, material, weight, quantity, and/or the like consistent with the intended operation of a luggage case having a built in luggage scale implementation. Implementations are not limited to uses of any specific parts, devices and components; provided that the parts, devices and components selected are consistent with the intended operation of a luggage case having a built in luggage scale implementation.

Implementations of a luggage case having a built in luggage scale and implementing components may be constructed of a wide variety of materials. For example, the components may be formed of: polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; glasses (such as fiberglass), carbon-fiber, aramid-fiber, any combination thereof, and/or other like materials; composites and/or other like materials; natural and synthetic fabrics, such as nylon, canvas, leather, and/or other like materials; metals, such as zinc, magnesium, titanium, copper, lead, iron, steel, carbon steel, alloy steel, tool steel, stainless steel, brass, tin, antimony, aluminum, any combination thereof, and/or other like materials; alloys, such as aluminum alloy, titanium alloy, magnesium alloy, copper alloy, any combination thereof, and/or other like materials; any other suitable material; and/or any combination of the foregoing thereof.

Some components defining and/or other like materials and/or other like materials assembly implementations may be manufactured simultaneously and integrally joined with one another, while other components may be purchased pre-manufactured or manufactured separately and then assembled with the integral components. Various implementations may be manufactured using conventional procedures as added to and improved upon through the procedures described here. For the exemplary purposes of this disclosure, at least second frame 12, first frame 24 and luggage case 4 may be formed separately and then integrally joined together. Also, the at least one load sensor 28, and implementing components, may be formed separately and then integrally joined with other components defining a luggage case having a built in luggage scale.

Accordingly, manufacture of these components separately or simultaneously may involve vacuum forming, injection molding, blow molding, casting, forging, cold rolling, milling, drilling, reaming, turning, grinding, stamping, pressing, cutting, bending, welding, soldering, hardening, riveting, punching, plating, and/or the like. Components manufactured separately may then be coupled or removably coupled with the other integral components in any manner, such as with adhesive, a weld joint, a solder joint, a fastener, washers, retainers, wrapping, wiring, any combination thereof, and/or the like for example, depending on, among other considerations, the particular material forming the components.

Contemplated implementations of a luggage case having a built in luggage scale are many and can apply in many situations. While the specific implementations of a luggage case having a built in luggage scale may initially be particularly useful in assisting travelers efficiently and easily pack and monitor the weight of their luggage in real-time as the luggage is being packed, they also have many additional implementations in various other applications for which the desirability of the capabilities of the device described will become readily apparent from the present disclosure. The specific parts, devices and components discussed in this application in no way restrict any possible implementation of the principles here disclosed. Additionally, while particular examples of components may be described in this disclosure, these examples do not serve to limit in any way the potential types of components or reconfigurability that may be implemented. Those skilled in the art will be able with the principles here disclosed to create many potential implementations.

The invention claimed is:
1. A luggage case with a built-in scale, the luggage case comprising:
 a first frame coupled to and substantially coextensive with
  a bottom wall of a luggage case, the luggage case com- prising a lid movable between open and closed positions, the lid being substantially parallel to the bottom wall in its closed position;

a second frame moveably coupled to and substantially parallel to the first frame; and at least one load sensor between the first frame and the second frame, the at least one load sensor configured to measure a weight of the luggage case.

2. The luggage case of claim 1, wherein the first frame or the second frame further comprises a handle, one or more feet, and one or more wheels, the one or more wheels coupled with the first frame and extending from the first frame substantially parallel to the bottom wall of the luggage case.

3. The luggage case of claim 1, wherein the second frame is substantially coextensive with the first frame.

4. The luggage case of claim 1, wherein the at least one load sensor comprises at least three load sensors.

5. The luggage case of claim 1, further comprising an analog display operatively coupled to the at least one load sensor and wherein the at least one load sensor comprises a spring-loaded analog scale.

6. The luggage case of claim 1, wherein the at least one load sensor comprises an electronic load cell.

7. The luggage case of claim 6, further comprising a digital readout circuit board and display operatively coupled to the at least one load sensor.

8. A luggage case having a scale device, the luggage case comprising:

a second frame comprising a depth defined between at least one second frame contact surface and a perimeter edge, the perimeter edge comprising a suspensory trap;

a first frame coupled to the luggage case and comprising at least one first frame contact surface and a perimeter lip, the perimeter lip slidably coupled with the suspensory trap so that the first frame moves vertically with respect to the second frame without the perimeter lip decoupling from the suspensory trap; and at least one load sensor disposed between the first frame and the second frame, the at least one load sensor in mechanical communication with the at least one first frame contact surface and the at least one second frame contact surface.

9. The luggage case of claim 8, further comprising a handle, one or more feet, and one or more wheels, the one or more wheels extending from the second frame substantially parallel to a bottom wall of the luggage case.

10. The luggage case of claim 8, wherein the second frame is substantially coextensive with the first frame.

11. The luggage case of claim 8, wherein the at least one load sensor comprises an analog display and one or more spring-loaded analog sensors.

12. The luggage case of claim 8, further comprising an electronic load cell operatively coupled to the at least one load sensor.

13. The luggage case of claim 12, further comprising a digital readout circuit board and display operatively coupled to the at least one load sensor.

14. The luggage case of claim 8, wherein the at least one load sensor comprises three or more load sensors.

* * * * *